United States Patent Office 3,605,895
Patented Sept. 20, 1971

3,605,895
IMPARTING IN SITU STABILITY TO DISPLACING FLUIDS
Stanley C. Jones, Littleton, Colo., assignor to Marathon Oil Company, Findlay, Ohio
No Drawing. Continuation-in-part of application Ser. No. 693,103, Dec. 26, 1967, now Patent No. 3,520,366. This application Oct. 29, 1969, Ser. No. 872,405
Int. Cl. E21b 43/22
U.S. Cl. 166—273
13 Claims

ABSTRACT OF THE DISCLOSURE

A secondary-type recovery process wherein crude oil is recovered from a subterranean formation by displacing therethrough a displacing fluid comprised of electrolyte and semi-polar organic compound or semi-polar organic compound is improved by injecting into the formation before the displacing fluid a pre-slug containing electrolyte and semi-polar compound. Examples of displacing fluids include water- and oil-external emulsions, and water- and oil-external micellar dispersions and miscible-type fluids; examples of preslugs include preferably aqueous fluids but also include those which are substantially hydrocarbon. A mobility buffer slug can follow the displacing fluid. The displacing fluid and the mobility buffer can be displaced through the formation by a drive fluid which can be substantially hydrocarbon or aqueous.

CROSS REFERENCE TO RELATED APPLICATIONS

This is a continuation-in-part of U.S. Ser. No. 693,103, filed Dec. 26, 1967 and now U.S. Patent No. 3,520,366.

BACKGROUND OF THE INVENTION

United States Patent No. 3,275,075 to Gogarty et al. teaches the use of semi-polar compounds, such as alcohols, amines, and ketones in microemulsions. Such microemulsions are useful in secondary-type oil recovery. United States Patent No. 3,324,944 to Poettmann teaches a "pre-slug" injection of a non-polar organic liquid into the formation to improve the stability of flooding processes using a microemulsion.

Secondary-type recovery processes (including tertiary recovery) utilizing displacing fluids containing electrolyte and semi-polar compound or semi-polar compound sometimes experience a "leaching" or sorption of these components from the displacing fluid. It is postulated that the affinity of the interstitial water for these components tends toward equilibrium conditions at the juncture of the displacing fluid and interstitial water. As a result, the flooding characteristics with these displacing fluids are adversely changed.

Applicants have discovered that by injecting a pre-slug containing electrolyte and semi-polar compound into the subterranean formation before injection of the displacing fluid, characteristics of the fluid can be better stabilized to improve oil recovery.

DESCRIPTION OF THE INVENTION

This invention is especially applicable to a secondary and tertiary recovery process wherein a subterranean formation is flooded with a displacing fluid containing semi-polar compound and electrolyte or semi-polar compound. The displacing fluid can be any fluid which will effectively displace crude petroleum from the subterranean formation. Examples of such fluids include water- and oil-external emulsions, and water- and oil-external micellar dispersions, miscible-type fluids such as semi-polar organic compounds (e.g. alcohols) and substantially hydrocarbon or aqueous fluids containing semi-polar organic compounds, other additives to impart desired characteristics to the flood, etc.

Preferably, the displacing fluid is a micellar dispersion. The term "micellar dispersion" as used herein, is meant to include "micro-emulsions" [Schulman and Montagne, Annals of the New York Academy of Sciences, 92, pages 366–371 (1961)], oleopathic hydro-micelles [Hoar and Schulman, Nature, 152, page 102 (1943)], "transparent" emulsions (Blair, Jr. et al., United States Patent No. 2,356,205) and micellar solutions defined in United States Patent Nos. 3,254,714; 3,275,075; 3,301,325; 3,307,628; and 3,330,344. Examples of micellar dispersions include those taught in United States Patent No. 3,348,611 to Reisberg.

The micellar dispersions are preferably comprised of hydrocarbon, aqeous medium, surfactant, and semi-polar organic compound or semi-polar organic compound and electrolyte. Examples of hydrocarbon include crude oil, crude column overheads, straight-run gasoline, liquefied petroleum gases, extracts of crude oil and synthesized hydrocarbons. Useful surfactants include cationic, nonionic and anionic surface-active compounds. A particularly useful surfactant is petroleum sulfonate containing a mono-valent cation (e.g. potassium, sodium, or ammonium). Examples of useful surfactants include those disclosed in U.S. 3,275,075.

Semi-polar compounds, also known as co-surfactants and co-solubilizers, useful with the displacing fluids, especially the micellar dispersions, include alcohols, amines, esters, aldehydes, and ketones containing one up to about 20 or more carbon atoms. Preferably, the semi-polar compound is an alcohol, e.g. ethanol, isopropanol, n- and isobutanol, the amyl alcohols, 1- and 2-hexanol, 1- and 2-octanol, the decyl alcohols, alkyl aryl alcohols such as p-nonyl phenol and alcoholic liquors such as fusel oil.

Electrolytes useful with the displacing fluids (especially the micellar dispersions) include inorganic bases, inorganic acids, inorganic salts, organic bases, organic acids, and organic salts. Preferably, the electrolytes are inorganic bases, inorganic acids and inorganic salts, e.g. sodium hydroxide, sodium chloride, sodium sulfate, hydrochloric acid, sulfuric acid, and sodium nitrate. Other useful electrolytes can be found in U.S. 3,330,343. Also, the salts contained in brackish or brine water are to be included as electrolytes.

The displacing fluid can also contain other components, e.g. bactericides, corrosion and oxidation inhibitors, sequestering agents, etc.

Some subterranean formations contain interstitial water, including water from waterflooding, which tends to "leach" or "sorb" the semi-polar compound and/or electrolyte from the displacing fluid, especially micellar dispersions. As a result, the operational characteristics of the displacing fluid in the formation are adversely affected.

The use of a pre-slug containing semi-polar compound and electrolyte inhibits the tendency of the formation to degrade the displacing fluid and other injected fluids, e.g. a mobility buffer. Preferably, the pre-slug is aqueous, but can be non-aqueous. The pre-slug is different in composition from the displacing fluid, i.e. it is distinct and not the same. It preferably contains at the juncture with the displacing fluid, sufficient semi-polar compound and electrolyte to establish equilibrium at an early time during the flooding process with similar components within the front portion of the displacing fluid. The semi-polar compound and electrolyte used in the pre-slug can be identical to similar components used in the displacing fluid. Other components can be incorporated into the pre-slug to impart desired characteristics, e.g. corrosion inhibitors, bactericides, agents to inactivate surfactant sorption sites on the rock surface, etc. Examples of amounts useful in the pre-slug include from about 0.1% to about 5 volume percent or more of the semi-polar compound and from about 0.01% to about 5 weight percent or more of the electrolyte. The pre-slug is not a hydrous soluble oil or micellar solution.

Electrolytes exhibiting characteristics to reduce the swelling tendency of the clays within the reservoir sands are especially useful where water sensitive clays are encountered. With such electrolytes, permeability of the sands can be maintained at a more desired value.

After the pre-slug and displacing fluid are injected into the subterranean formation, there can be injected a mobility buffer slug such as a non-polar material, [e.g. LPG (liquefied petroleum gas)], water-external emulsion, or a polar material (e.g. water). The mobility buffer should have a sufficiently low mobility to protect the displacing fluid from invasion by a subsequent drive fluid. The mobility buffer preferably has a mobility equal to about that or less than about that of the displacing fluid. More preferably, a portion (i.e. from 5% to 100%) of the mobility buffer can have mobilities graded from a low of about that of the displacing fluid to a high of about that of the water drive. Thereafter, sufficient amounts of a drive fluid, e.g. hydrocarbon or aqueous medium, are injected into the formation to displace the pre-slug, displacing fluid and mobility buffer (optional) toward a production well.

The mobility buffer is preferably water containing a mobility reducing agent. Useful examples of mobility buffers (also known as thickened drive materials) are found in United States Patent No. 3,261,399 to Coppel. Any agent which will effectively reduce the mobility (e.g. increases the apparent viscosity) of the mobility buffer and which is compatible with the mobility buffer and the displacing fluid is useful with this invention. Preferred mobility reducing agents include polysaccharides, high molecular weight, partially hydrolyzed polyacrylamides, polyisobutylene (with hydrocarbon buffer), etc.

Generally, the amount of pre-slug injected into the formation will depend upon the particular characteristics of the formation, and on the composition and amount of the displacing fluid. The volume of the pre-slug is preferably about equal to the volume of the displacing fluid injected into the formation. Generally, the amount of the pre-slug need be only about 1% to about 30% and preferably from about 2% to about 10% formation pore volume. The amount of the displacing fluid can range from about 1% up to about 30% and preferably from about 2% up to about 10% formation pore volume when micellar dispersions are used.

The following examples are presented to specifically illustrate working embodiments of the invention. The examples are not intended to limit in any way the invention. The operational procedure, components within the pre-slugs, components within the micellar dispersions, etc. can be varied. It is intended that all equivalents known or obvious to those skilled in the art be included within the scope of this invention as defined in the specification and appended claims. Percents are based on volume unless otherwise specified.

Example I

Berea sandstone cores 4 feet long by 2 inches in diameter having characteristics indicated in Table 1 are saturated with distilled water containing 16,500 p.p.m. of NaCl and are then flooded to irreducible water saturation with crude oil taken from the Wilkin lease in Illinois (a sweet, black crude oil having a 9.0 cp. viscosity at 72° F. and a specific gravity of 0.846). Core samples B and C are flooded with 10% pore volume of a pre-slug composed of 18,000 p.p.m. of NaCl dissolved in distilled water and containing amounts of isopropanol indicated in Table 1. Core sample A is not treated with a pre-slug. The cores are flooded with 10% formation pore volume of a micellar dispersion consisting of 62.7% straight-run gasoline, 10.5% of an ammonium petroleum sulfonate (containing about 80% active sulfonate), 1.8% isopropanol and 25% of distilled water containing 9,000 p.p.m. of NaCl. Thereafter, there is injected into the cores 1.2 pore volumes of a mobility buffer (thickened water) composed of 500 p.p.m. of No. 530 Pusher (a high molecular weight partially hydrolyzed polyacrylamide sold by Dow Chemical Company), 500 p.p.m. of NaCl and 50 p.p.m. of $NH_4SCN$ dissolved in distilled water. Table 1 contains results of the core tests:

TABLE 1

| Sample | Core characteristics | | | Pre-slug composition, 18,000 p.p.m. NaCl plus indicated percent of isopropanol | Crude oil recovery | |
|---|---|---|---|---|---|---|
| | Effective porosity (percent) | Permeability (md.) | Percent oil saturation | | Percent recovery of crude in core | Percent improvement over Sample A |
| A | 18.4 | 189 | 64.7 | Not treated with pre-slug. | 82.3 | 0 |
| B | 19.9 | 307 | 63.8 | 1 | 91.2 | 11 |
| C | 20.5 | 215 | 65.7 | 2 | 93.6 | 14 |

What is claimed is:
1. A process for the recovery of crude oil from a subterranean formation wherein a displacing fluid comprised of electrolyte and semi-polar organic compound or semi-polar organic compound is injected into and displaced through the formation to recover crude oil through at least one production means in fluid communication with the formation, the process comprising injecting before the displacing fluid a pre-slug containing semi-polar organic compound and electrolyte, the pre-slug not being a hydrous soluble oil or a micellar solution and being different in composition from the displacing fluid.

2. The process of claim 1 wherein the pre-slug is aqueous.

3. The process of claim 1 wherein the components within the back portion of pre-slug are initially at sufficient concentration to establish equilibrium with similar component within the front portion of the displacing fluid.

4. The process of claim 1 wherein the displacing fluid is a micellar dispersion.

5. A process for the recovery of crude oil from a subterranean formation wherein a displacing fluid is injected into the formation through at least one injection means to displace the crude oil toward at least one production means, the successive injections into the formation comprising:
   (1) a pre-slug comprised of semi-polar organic compound and electrolyte, the pre-slug not being a hydrous soluble oil or a micellar solution and being different in composition from the displacing fluid,
   (2) a displacing fluid comprised of semi-polar organic compound and electrolyte or semi-polar organic compound,
   (3) a mobility buffer, and
   (4) a drive fluid in amounts sufficient to displace the displacing fluid toward at least one production means and recovering crude oil through said production means.

6. The process of claim 5 wherein the components within the back portion of the aqueous pre-slug are initially at sufficient concentration to substantially establish equilibrium with the component(s) in the front portion of the displacing fluid.

7. The process of claim 5 wherein the displacing fluid is a micellar dispersion.

8. The process of claim 5 wherein the mobility buffer has a mobility equal to about that or less than about that of the displacing fluid.

9. A process for the recovery of crude oil from subterranean formations wherein a micellar dispersion is injected into the formation through at least one injection means to displace the crude oil toward at least one production means, the successive injections comprising:
   (1) an aqueous pre-slug comprised of semi-polar organic compound and electrolyte, the aqueous pre-slug not being a hydrous soluble oil or micellar solution,
   (2) a micellar dispersion comprised of hydrocarbon, water, surfactant and semi-polar organic compound and electrolyte or semi-polar organic compound,
   (3) a mobility buffer, and
   (4) sufficient drive fluid to displace the micellar dispersion and mobility buffer toward the production means and recovering crude oil through said production means.

10. The process of claim 9 wherein the drive fluid is an aqueous medium.

11. The process of claim 9 wherein the electrolyte and semi-polar compound within the back portion of the aqueous pre-slug are substantially at equilibrium with the electrolyte and semi-polar compound in the front portion of the micellar dispersion.

12. The process of claim 9 wherein the mobility buffer has a mobility equal to about that or less than about that of the micellar dispersion.

13. The process of claim 9 wherein a portion of the mobility buffer is characterized as having graded mobilities increasing from a low of about that of the micellar dispersion to a high of about that of the water drive.

References Cited
UNITED STATES PATENTS

| | | | |
|---|---|---|---|
| 3,266,570 | 8/1966 | Gogarty | 166—273 |
| 3,297,084 | 1/1967 | Gogarty et al. | 166—273 |
| 3,406,754 | 10/1968 | Gogarty | 166—273 |

STEPHEN J. NOVOSAD, Primary Examiner